United States Patent
Taylor et al.

(10) Patent No.: US 10,250,083 B2
(45) Date of Patent: Apr. 2, 2019

(54) SYSTEM AND METHOD FOR COMMUNICATION IN WIRELESS POWER SUPPLY SYSTEMS

(71) Applicant: Philips IP Ventures B.V., Eindhoven (NL)

(72) Inventors: Joshua B. Taylor, Rockford, MI (US); Matthew J. Norconk, Grand Rapids, MI (US); Colin J. Moore, Grand Rapids, MI (US); Benjamin C. Moes, Wyoming, MI (US); Merdad Veiseh, Spring Lake, MI (US); Dale R. Liff, Kent, OH (US); Mark A. Blaha, Twinsburg, OH (US); Jason L. Amistadi, Lyndhust, OH (US)

(73) Assignee: PHILIPS IP VENTURES B.V., Eindhoven (NL)

( * ) Notice: Subject to any disclaimer, the term of this patent is extended or adjusted under 35 U.S.C. 154(b) by 531 days.

(21) Appl. No.: 14/400,731

(22) PCT Filed: Mar. 14, 2013

(86) PCT No.: PCT/US2013/031126
§ 371 (c)(1),
(2) Date: Nov. 12, 2014

(87) PCT Pub. No.: WO2013/176751
PCT Pub. Date: Nov. 28, 2013

(65) Prior Publication Data
US 2015/0194814 A1 Jul. 9, 2015

Related U.S. Application Data

(60) Provisional application No. 61/649,341, filed on May 20, 2012, provisional application No. 61/649,561, filed on May 21, 2012.

(51) Int. Cl.
*H01J 5/00* (2006.01)
*H04B 5/00* (2006.01)
(Continued)

(52) U.S. Cl.
CPC .............. *H02J 50/80* (2016.02); *H02J 5/005* (2013.01); *H02J 7/025* (2013.01); *H02J 50/12* (2016.02);
(Continued)

(58) Field of Classification Search
CPC ..... H02J 5/005; H04B 5/0031; H04B 5/0037; H04B 5/0087; Y02B 60/50; Y10T 307/406
See application file for complete search history.

(56) References Cited

U.S. PATENT DOCUMENTS 5,801,372 A 9/1998 Yamaguchi
2005/0077356 A1* 4/2005 Takayama .......... G06K 7/10237
235/451
(Continued)

FOREIGN PATENT DOCUMENTS

EP 1 575 183 9/2005
JP H09-62816 3/1997
(Continued)

OTHER PUBLICATIONS

International Search Report and Written Opinion of the International Searching Authority for International Application No. PCT/US2013/031126 dated Jul. 1, 2013.
(Continued)

Primary Examiner — Rexford Barnie
Assistant Examiner — Elim Ortiz

(57) ABSTRACT

The present invention relates to wireless power supplies adapted to supply power and communicate with one or more remote devices. The systems and methods of the present
(Continued)

invention generally relate to a communication timing system that may ensure information being communicated does not overlap with that of another device, preventing data collisions and information from going undetected. With information being communicated in a way that addresses or avoids potential communication issues in multiple device systems, the wireless power supply may control operation to effectively supply wireless power.

25 Claims, 8 Drawing Sheets

(51) Int. Cl.
    *H02J 50/80*     (2016.01)
    *H02J 50/12*     (2016.01)
    *H02J 7/02*     (2016.01)
    *H02J 50/60*     (2016.01)
    *H02J 5/00*     (2016.01)

(52) U.S. Cl.
    CPC ............ *H02J 50/60* (2016.02); *H04B 5/0031* (2013.01); *H04B 5/0037* (2013.01); *H04B 5/0087* (2013.01); *Y10T 307/406* (2015.04)

(56) References Cited

U.S. PATENT DOCUMENTS

| | | | |
|---|---|---|---|
| 2007/0273486 A1* | 11/2007 | Shiotsu | H04B 5/02 340/10.34 |
| 2009/0284082 A1* | 11/2009 | Mohammadian | G06K 7/0008 307/104 |
| 2010/0036773 A1* | 2/2010 | Bennett | G06Q 20/3674 705/67 |
| 2010/0142509 A1* | 6/2010 | Zhu | H04B 1/1607 370/343 |
| 2010/0181961 A1* | 7/2010 | Novak | H02J 7/025 320/108 |
| 2011/0074552 A1* | 3/2011 | Norair | G06K 7/0008 340/10.1 |
| 2011/0127951 A1* | 6/2011 | Walley | H02J 7/025 320/108 |
| 2012/0025760 A1 | 2/2012 | Uramoto et al. | |
| 2012/0185708 A1* | 7/2012 | Rekimoto | G06F 1/266 713/310 |
| 2012/0242283 A1* | 9/2012 | Kim | H02J 5/005 320/108 |
| 2017/0085135 A1 | 3/2017 | Stevens et al. | |

FOREIGN PATENT DOCUMENTS

| | | |
|---|---|---|
| JP | 2000-209121 | 7/2000 |
| JP | 2005-168069 | 6/2005 |
| JP | 2008-206327 | 9/2008 |
| JP | 2009-148108 | 7/2009 |
| JP | 2010-104203 | 5/2010 |
| JP | 2011-030422 | 2/2011 |
| JP | 2011-120361 | 6/2011 |
| JP | 2011-525097 | 9/2011 |
| JP | 2012-034454 | 2/2012 |
| WO | 2006/004990 | 1/2006 |
| WO | 2011/102641 | 8/2011 |

OTHER PUBLICATIONS

Office Action for co-pending Japanese Patent Application No. 2015-514008 dated Feb. 7, 2017.
Office Action for co-pending Chinese Patent Application No.201310310721.8 dated May 24, 2016.

* cited by examiner

SYSTEM AND METHOD FOR COMMUNICATION IN WIRELESS POWER SUPPLY SYSTEMS

BACKGROUND OF THE INVENTION

The present invention relates to wireless power supply systems, and more particularly to systems and methods for communicating in a wireless power supply system.

Many conventional wireless power supply systems rely on inductive power transfer to convey electrical power without wires. A typical inductive power transfer system includes an inductive power supply that uses a primary coil (or a transmitter) to wirelessly transfer energy in the form of a varying electromagnetic field and a remote device that uses a secondary coil (or a receiver) to convert the energy in the electromagnetic field into electrical power. Recognizing the potential benefits, some developers have focused on producing wireless power supply systems with adaptive control systems. Adaptive control systems may give the wireless power supply the ability to adapt operating parameters over time to maximize efficiency and/or control the amount of power being transferred to the remote device.

Conventional adaptive control systems may vary operating parameters, such as resonant frequency, operating frequency, rail voltage or duty cycle, to supply the appropriate amount of power and to adjust various operating conditions. For example, it may be desirable to vary the operating parameters of the wireless power supply based on the number of electronic device(s), the general power requirements of the electronic device(s) and the instantaneous power needs of the electronic device(s). As another example, the distance, location and orientation of the electronic device(s) with respect to the primary coil may affect the efficiency of the power transfer, and variations in operating parameters may be used to optimize operation. In a further example, the presence of parasitic metal in range of the wireless power supply may affect performance or present other undesirable issues. The adaptive control system may respond to the presence of parasitic metal by adjusting operating parameters or shutting down the power supply. In addition to these examples, those skilled in the field will recognize additional benefits from the use of an adaptive control system.

To provide improved efficiency and other benefits, it is not uncommon for conventional wireless power supply systems to incorporate a communication system that allows the remote device to communicate with the power supply. In some cases, the communication system allows one-way communication from the remote device to the power supply. In other cases, the system provides bi-directional communications that allow communication to flow in both directions. For example, the remote device may communicate its general power requirements prior to initiation of wireless power transfer and/or real-time information during wireless power transfer. The initial transfer of general power requirements may allow the wireless power supply to set its initial operating parameters. The transfer of information during wireless power transfer may allow the wireless power supply to adjust its operating parameters during operation. For example, the remote device may send communications during operation that include information representative of the amount of power the remote device is receiving from the wireless power supply. This information may allow the wireless power supply to adjust its operating parameters to supply the appropriate amount of power at optimum efficiency. These and other benefits may result from the existence of a communication channel from the remote device to the wireless power supply.

An efficient and effective method for providing communication in a wireless power supply that transfers power using an inductive field is to overlay the communications on the inductive field. This allows communication without the addition of a separate wireless communication link. One common method for embedding communications in the inductive field is referred to as "backscatter modulation." Backscatter modulation relies on the principle that the impedance of the remote device is conveyed back to the power supply through reflected impedance. With backscatter modulation, the impedance of the remote device may be selectively varied to create a data stream (e.g., a bit stream) that is conveyed to the power supply by reflected impedance. For example, the impedance may be modulated by selectively applying a load resistor to the secondary circuit. The power supply monitors a characteristic of the power in the tank circuit that is impacted by the reflected impedance. For example, the power supply may monitor the current in the tank circuit for fluctuations that represent a data stream.

As the industry grows to use wireless power supply systems that supply power wirelessly to multiple remote devices, communication between the power supply and multiple remote devices has become more important. Devices may have specific power needs that affect performance of the wireless power supply, and may desire to communication those needs. However, with multiple remote devices attempting to communicate, there is a possibility of data collision and data loss. Loss of communication may prevent the devices from communicating power requirements and possibly result in too much or too little power being transferred, potentially damaging a device. There also may be too much or too little power transferred if one or more of the remote devices is incapable of communicating information to the wireless power supply.

Conventional wireless power transfer systems have employed separate communication channels, such as Bluetooth or other RF communication systems, to manage communication with multiple devices. These systems, however, add cost and complexity to the remote devices and the wireless power supply. And, the long distance capabilities of RF communication systems may result in communication with remote devices not present near the wireless power supply. For example, if two wireless power supplies, each associated with a remote device to be charged, are in the same room and use an RF communication system, there may be communication errors with the remote devices during power transfer.

SUMMARY OF THE INVENTION

The present invention relates to wireless power supplies adapted to supply power and communicate with one or more remote devices. The systems and methods of the present invention generally relate to a communication timing system that may ensure information being communicated from one device does not overlap with that of another device, preventing data collisions and information from going undetected.

In one embodiment, a wireless power supply for transferring power to at least one remote device includes a wireless power transmitter and a communication circuit. The wireless power transmitter may transfer power to the at least one remote device, and may be configured to form an inductive power link between the wireless power supply and the at least one remote device. The communication circuit may be coupled to the wireless power transmitter, and may be configured to transmit and receive information from the at least one remote device via the inductive power link. The information transmitted to the at least one remote device may provide timing information to the at least one remote device about time slots in which the communication circuit is configured to receive communication from the at least one remote device. As an example, the information may include state information about each of the time slots, indicating whether each time slot is assigned or open. The communication circuit may change the state of one of the time slots in response to receiving communication from a remote device in that time slot.

In one embodiment, the wireless power supply may be configured to transfer power to a plurality of remote devices, and the communication circuit may be configured to assign each of the remote devices to one of the time slots.

In one embodiment, the wireless power supply may adjust a characteristic of power in response to information received from the remote device during a time slot. For example, the wireless power supply may increase or decrease power output based on a request to increase or decrease power from the remote device.

In one embodiment, a method of operating a wireless power supply system to transfer power to at least one remote devices includes placing the remote device in sufficient proximity to the wireless power supply to form an inductive power link between the wireless power supply and the remote device, and operating the wireless power supply to transfer power to the remote device via the inductive power link. The method further includes transmitting, from the wireless power supply, a communication packet to the remote device via the inductive power link, where the communication packet includes timing information about time slots in which the wireless power supply is configured to receive communication from the remote device and receiving, in the wireless power supply, a message from the remote device.

The method may further include associating the remote device with one of the time slots in which the remote device has communicated, and changing the state of the associated time slots from open to assigned.

In one embodiment, the method may further include receiving a second message from another remote device in another of the time slots, and associating the another remote device with the another time slot.

In one embodiment, a remote device for receiving power from a wireless power supply includes a wireless power receiver, communication circuitry and a load. The wireless power receiver may generate electrical power in response to a field generated by the wireless power supply, and the communication circuitry may communicate to and from the wireless power supply. The load may be coupled to the wireless power receiver, and may receive electrical power generated in the wireless power receiver in response to said field. The communication circuitry may be configured to receive information relating to a plurality of time slots in which the wireless power supply is configured to receive communication from said remote device, and may be configured to select one of the plurality of time slots to communicate in. The communication circuitry may also transmit a message in the selected time slot. For example, the remote device may also wait for the wireless power supply to indicate a start of the selected time slot before transmitting the message.

In one embodiment, the remote device may transmit a message including information relating to a request to adjust an amount of power being transmitted by the wireless power supply via the field.

In one embodiment, the remote device may be configured to select a different time slot in response to information received from the wireless power supply that indicates a state of the selected time slot remains unchanged from an open state despite the remote device transmitting a message in the selected time slot.

In one embodiment, the remote device may be configured to regulate power being received by at least one of reducing power being received, reconfiguring an impedance of said wireless power receiver, reconfiguring rectification circuitry, and varying a Q of said remote device.

The present invention provides a simple and effective communication system that allows control of the timing of communication of one or more remote devices over a wireless power link. In this way, data collisions and data loss may be prevented or reduced because the system attempts to avoid communication from one device overlapping with that of another device. With stable communication between the wireless power supply and one or more remote devices, the wireless power supply may, for example, control supply of power to one or more remote devices according to the operating parameters of each remote device.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

A. Overview

The present invention relates to wireless power supplies adapted to supply power and communicate with one or more remote devices. The systems and methods of the present invention generally relate to a communication timing system that may ensure information being communicated from one device does not overlap with that of another device, preventing data collisions and information from going undetected. With information being communicated in a way that addresses or avoids potential communication issues in multiple device systems, the wireless power supply may control operation to effectively supply wireless power. For example, the present invention may preserve the ability of the wireless power supply to receive control signals relating to operation of the wireless power transfer system, such as signals that identify the remote device, provide wireless power supply control parameters or provide information in real-time relating to wireless power supply (e.g., current, voltage, temperature, battery condition, charging status and remote device status). As another example, the present invention may preserve the ability of the wireless power supply to receive communications relating to the transfer of data unrelated to the wireless power transfer system, such as transferring information associated with features of the remote device, including synchronizing calendars and to-do lists or transferring files (e.g., audio, video, image, spreadsheet, database, word processing and application files—just to name a few).

Figure 1:
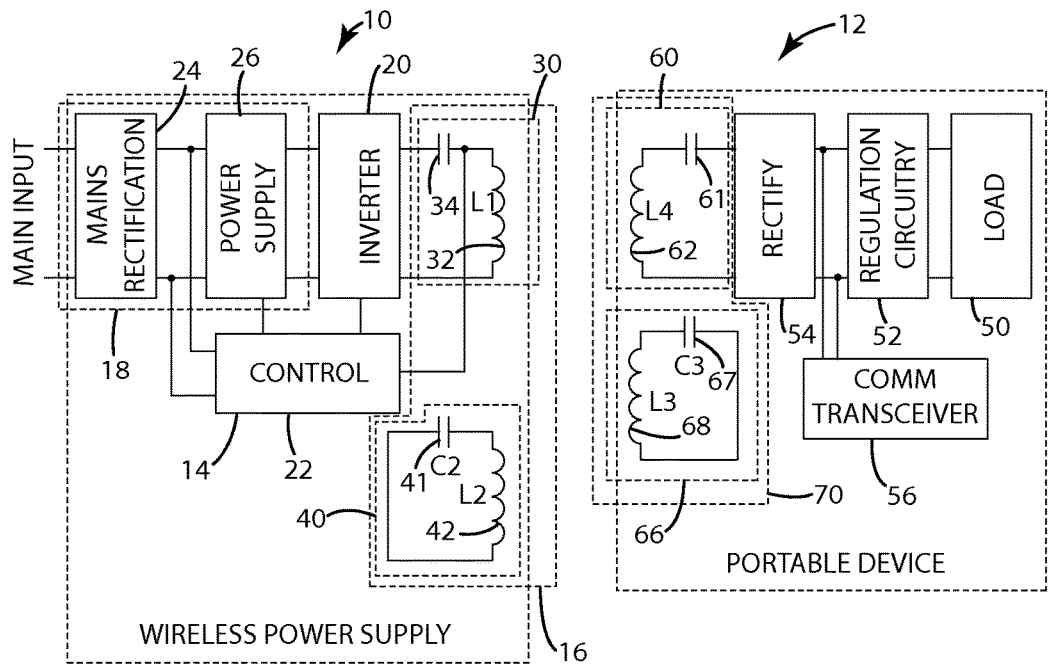
FIG. 1 is a schematic representation of a wireless power supply and a remote device in accordance with an embodiment of the present invention.
Figure 2:
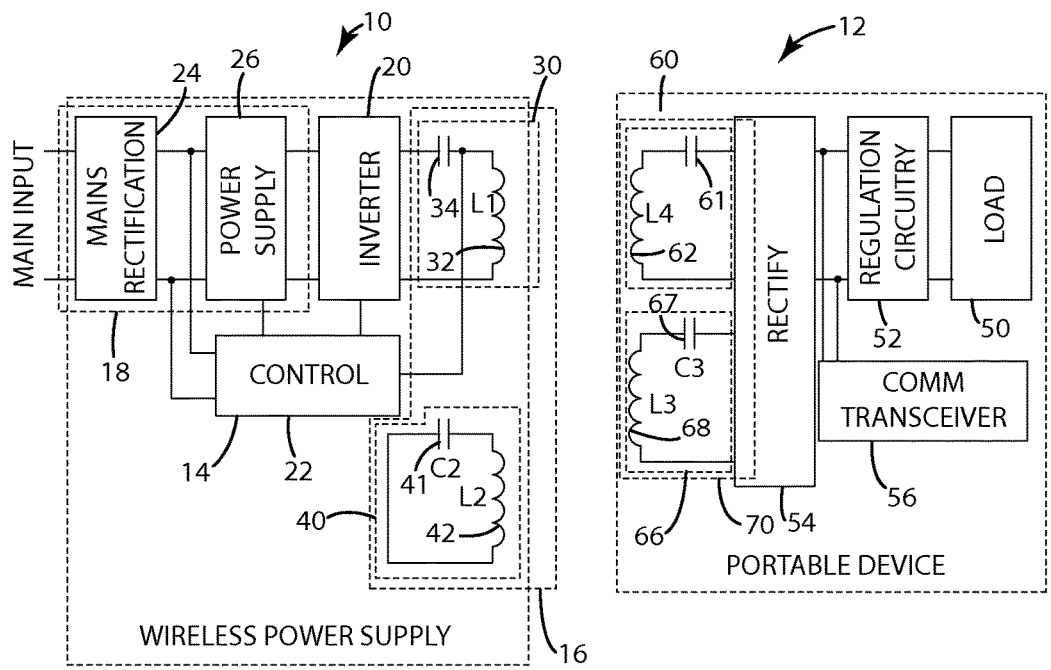
FIG. 2 is a schematic representation of the wireless power supply and the remote device in accordance with an embodiment of the present invention.
Figure 3:
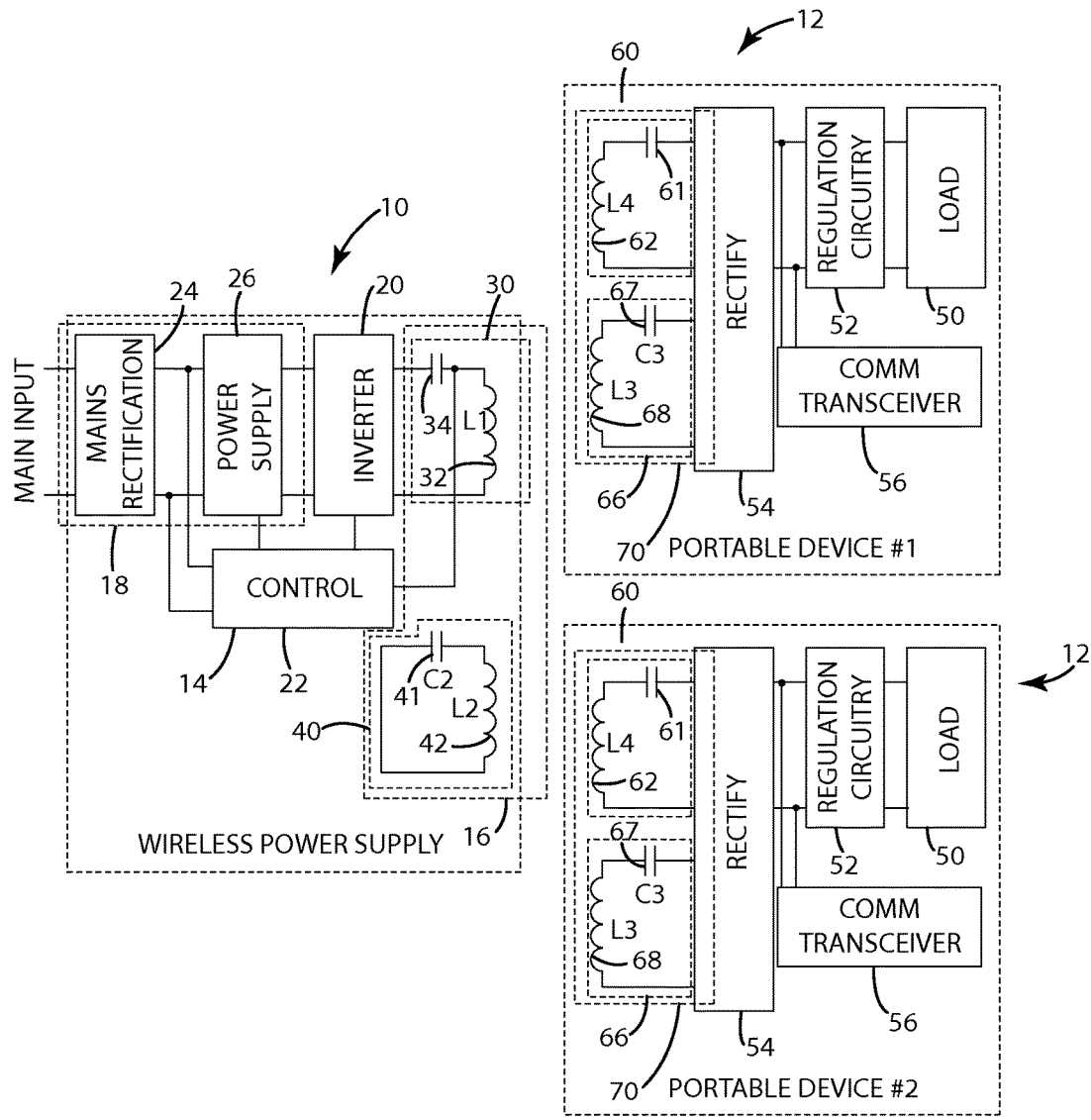
FIG. 3 is a schematic representation of the wireless power supply and multiple remote devices configured to receive power irrespective of coupling in accordance with an embodiment of the present invention.

A wireless power supply 10 and one or more remote devices 12 in accordance with an embodiment of the present invention are shown in FIGS. 1-3. The wireless power supply 10 generally includes an adaptive control system 14, communication system 22 and a wireless power transmitter 30. The communication system 22 is configured to communicate to one or more remote devices 12 by modulating power being applied to the wireless power transmitter 30. The communication system 22 may indicate a series of time slots available for responding back to the wireless power supply 10 in order to avoid remote devices 12 trying to communicate at the same time. The control system 14 may be configured to adjust operating characteristics to, among other things, improve transfer efficiency and control the amount of power supplied to the remote device 12. For example, the control system 14 may receive information from the communication system 22, and adjust an operating characteristic based on that received information.

B. System

An embodiment of the present invention will now be described with reference to FIGS. 1-3. The wireless power supply 10 of the FIGS. 1-3 embodiment generally includes a power supply 18, signal generating circuitry 20, a wireless power transmitter 16, a communication system 22 and an adaptive control system 14. In the current embodiment, the communication system 22 is integrated with the adaptive control system 14, but both may be implemented as separate circuitry or components in alternative embodiments. The power supply 18 of the current embodiment may be a conventional power supply that transforms an AC input (e.g., wall power) into an appropriate DC output that is suitable for driving the wireless power transmitter 16. As an alternative, the power supply 18 may be a source of DC power that is appropriate for supplying power to the wireless power transmitter 16. In this embodiment, the power supply 18 generally includes a rectifier 24 and a DC-DC converter 26. The rectifier 24 and DC-DC converter 26 provide the appropriate DC power for the power supply signal. The power supply 18 may alternatively include essentially any circuitry capable of transforming input power to a form used by the signal generating circuitry 20. In this embodiment, the adaptive control system 14 is configured to adjust operating parameters other than the rail voltage. Accordingly, the DC-DC converter 26 may have a fixed output. The adaptive control system 14 may additionally or alternatively have the ability to adjust rail voltage or switching circuit phase (described in more detail below). In an alternative embodiment where it is desirable to adjust operating parameters by varying the rail voltage, the DC-DC converter 26 may have a variable output. As shown in FIG. 1, the adaptive control system 14 may be coupled to the DC-DC converter 26 (represented by broken line) to allow the adaptive control system 14 to control the output of the DC-DC converter 26.

In this embodiment, the signal generating circuitry 20 includes switching circuitry that is configured to generate and apply an input signal to the wireless power transmitter 16. The switching circuitry may form an inverter that transforms the DC output from the power supply 18 into an AC output to drive the wireless power transmitter 30. The switching circuitry 28 may vary from application to application. For example, the switching may include a plurality of switches, such as MOSFETs, arranged in a half-bridge topology or in a full-bridge topology.

In this embodiment, the power transmitter 16 includes a tank circuit 30 having a primary coil 32 and a ballast capacitor 34 that are arranged to form a series resonant tank circuit and a re-resonator circuit 40 having a re-resonator coil 42 and a re-resonator capacitor 41. The present invention is not limited to use with a re-resonator circuit 40 and may instead transfer power wirelessly using the tank circuit 30 without a re-resonator circuit 40. The present invention is also not limited to use with series resonant tank circuits and may instead be used with other types of resonant tank circuits and even with non-resonant tank circuits, such as a simple inductor without matching capacitance. And, although the illustrated embodiment includes coils, the wireless power supply 10 may include alternative inductors or transmitters capable of generating a suitable electromagnetic field. Further, the present invention is not limited to use with a re-resonator circuit 40 and may not include a re-resonator circuit 40. And, the tank circuit 30 may transmit power without the re-resonator circuit 40.

In this embodiment, the communication system 22 is capable of (a) modulating the supply of power from the wireless power transmitter 16 to communicate information and (b) sensing modulations in the wireless power transmitter 16 that are fed back through the electromagnetic field from one or more remote devices 12 in order to receive communication. The communication system 22 described herein is exemplary. The present invention may be implemented using essentially any systems and methods capable of receiving communication over the inductive power link. Suitable communication systems and transceivers (including various alternative circuits) and various alternative communications methods are described in U.S. application Ser. No. 13/012,000, which is entitled SYSTEMS AND METHODS FOR DETECTING DATA COMMUNICATION OVER A WIRELESS POWER LINK, and was filed on Jan. 24, 2011, by Matthew J. Norconk et al; U.S. application Ser. No. 13/366,605, which is entitled SYSTEM AND METHOD OF PROVIDING COMMUNICATIONS IN A WIRELESS POWER TRANSFER SYSTEM, and was filed on Feb. 6, 2012, by Matthew J. Norconk et al; U.S. application Ser. No. 13/425,841, which is entitled SYSTEM AND METHOD FOR IMPROVED CONTROL IN WIRELESS POWER SUPPLY SYSTEMS, and was filed Mar. 21, 2012, by Joshua B. Taylor et al—all of which are incorporated herein by reference in their entirety.

The communication system 22 may be coupled to the tank circuit 30 to allow detection of signals indicative of one or more characteristics of the power in the tank circuit 30, such as the current, voltage and/or any other characteristics that are affected by reflected impedance from the remote device 12. In one embodiment, the communication system 22 includes a current sense transformer (not shown) that is coupled to the tank circuit 30 to provide a signal corresponding to the magnitude of the current in the tank circuit. Although not shown, the communication system 22 may include circuitry to filter, process and convert the signal produced by the sensor into a series of high and low signals representative of the data carried over the inductive power link.

Figure 10:
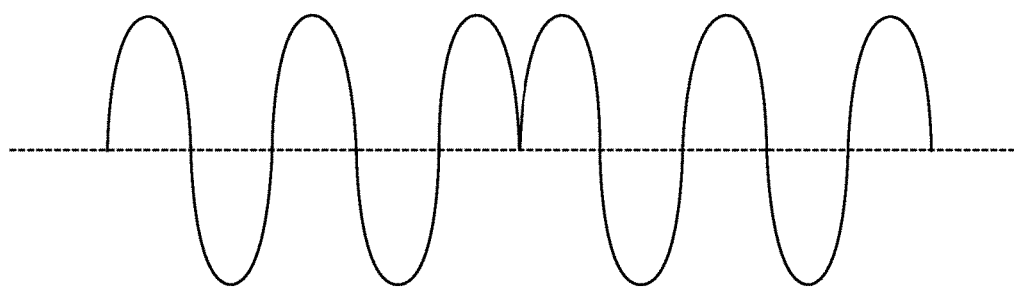
FIG. 10 is a representative graph of a phase inversion of a transmitted power signal used to provide communication to a remote device in accordance with an embodiment of the present invention.

The communication system 22 may also modulate the supply of power being supplied to the wireless power transmitter 16 to communicate to the one or more remote devices 12. This modulation may be accomplished using a variety of methods, including modulating operating frequency, resonant frequency, rail voltage, duty cycle, phase (e.g., in the case of a full bridge topology), a phase inverse topology (e.g., shown for example in FIG. 10), or a phase-shifted keyed communication topology in which the power signal is a carrier wave for an additional communication signal.

The communication system 22 described generally above may be implemented in a wide variety of different embodiments. For example, the communication system 22 may vary from embodiment to embodiment depending upon the type of modulation/demodulation implemented in that embodiment and/or depending on the details of the power supply circuitry. Further, each modulation/demodulation scheme may be implemented using a variety of different circuits. Generally speaking, the communication system 22 is configured to demodulate data as a function of a characteristic of power in the power supply that is affected by data communicated through reflected impedance and to modulate data by affecting a characteristic of power being supplied from the wireless power transmitter 16.

The adaptive control system 14 includes portions configured, among other things, to operate the switching circuitry 28 to produce the desired power supply signal to the wireless power transmitter 16. The adaptive control system 14 may control the switching circuitry 28 based on communications received from the remote device 12 via the communication system 22. The adaptive control system 14 of this embodiment includes control circuitry that performs various functions, such as controlling the timing of the switching circuit 28 and cooperating with the communication system 22 to extract and interpret communications signals. These functions may alternatively be handled by separate controllers or other dedicated circuitry.

A remote device 12 in accordance with an embodiment of the present invention will now be described in more detail with respect to FIGS. 1-3 and 9. The remote device 12 may include a generally conventional electronic device, such as a cell phone, a media player, a handheld radio, a camera, a flashlight or essentially any other portable electronic device. The remote device 12 may include an electrical energy storage device, such as a battery, capacitor or a super capacitor, or it may operate without an electrical energy storage device. The components associated with the principle operation of the remote device 12 (and not associated with wireless power transfer) are generally conventional and therefore will not be described in detail. Instead, the components associated with the principle operation of the remote device 12 are generally referred to as principle load 50. For example, in the context of a cell phone, no effort is made to describe the electronic components associated with the cell phone itself.

The remote device 12 of this embodiment generally includes a wireless receiver 70, rectification circuitry 54, a secondary communications transceiver 56 and a principle load 40. The wireless receiver 70 may include a secondary tank circuit 60 having a secondary coil 62 and secondary tank capacitor 61 and a secondary re-resonator circuit 66 having a secondary re-resonator coil 68 and secondary re-resonator capacitor 67. In the illustrated embodiment of FIG. 1, the secondary re-resonator circuit 66 is electrically isolated from the rectification circuitry 54, but in alternative embodiments, such as the illustrated embodiments of FIGS. 2 and 3, the secondary re-resonator circuitry 66 may be coupled to the rectification circuitry or other circuitry in the remote device. This coupling may allow the remote device 12 to affect the Q of the re-resonator circuitry 66, which, as will be described in further detail below, may be used to control the amount of power received wirelessly. The present invention is not limited to use with a secondary re-resonator circuit 66, and may not include a secondary re-resonator circuit 66. Further, instead of receiving power wirelessly using the secondary re-resonator circuit 66, the present invention may receive power via the secondary tank circuit 60 without a secondary re-resonator circuit 66.

It should be noted that the present invention is also not limited to use with series resonant tank circuits and may instead be used with other types of resonant tank circuits and even with non-resonant tank circuits, such as a simple inductor without a matching capacitance. And, although the illustrated embodiment includes coils, the remote device 12 may include alternative inductors or receivers capable of receiving power via a field or generating electrical power in response to a varying electromagnetic field generated by the wireless power supply 10.

The rectifier circuitry 54 and regulation circuitry 52 convert the AC power generated in the wireless power receiver 70 into power for operation of the load 50. The regulation circuitry 52 may, for example, include a DC-DC converter in those embodiments where conversion to and regulation of DC power is desired. In applications where AC power is desired in the remote device 12, the rectifier 54 may not be necessary.

The secondary communications transceiver 56 of this embodiment includes circuitry adapted to modulate and demodulate information via the wireless power link with the wireless power supply 10. To detect communication, the secondary communications transceiver 56 may use one or more of a peak detector, a root-mean-square (RMS) detector, a frequency detector and a phase-shift-keying (PSK) demodulator.

With regard to communicating information to the wireless power supply 10, the secondary communications transceiver 56 may selectively modulate a load characteristic of power to create data communications on the power signal using a backscatter modulation scheme. For example, the secondary communications transceiver 56 may apply a communication load to create data communications on the power signal using amplitude modulation, or may control the overall load or quality factor (Q factor) of the remote device 12. In operation, the secondary communication transceiver 56 may be configured to selectively couple the communication load to the wireless power receiver 70 at the appropriate timing to create the desired data transmissions.

Figure 9:
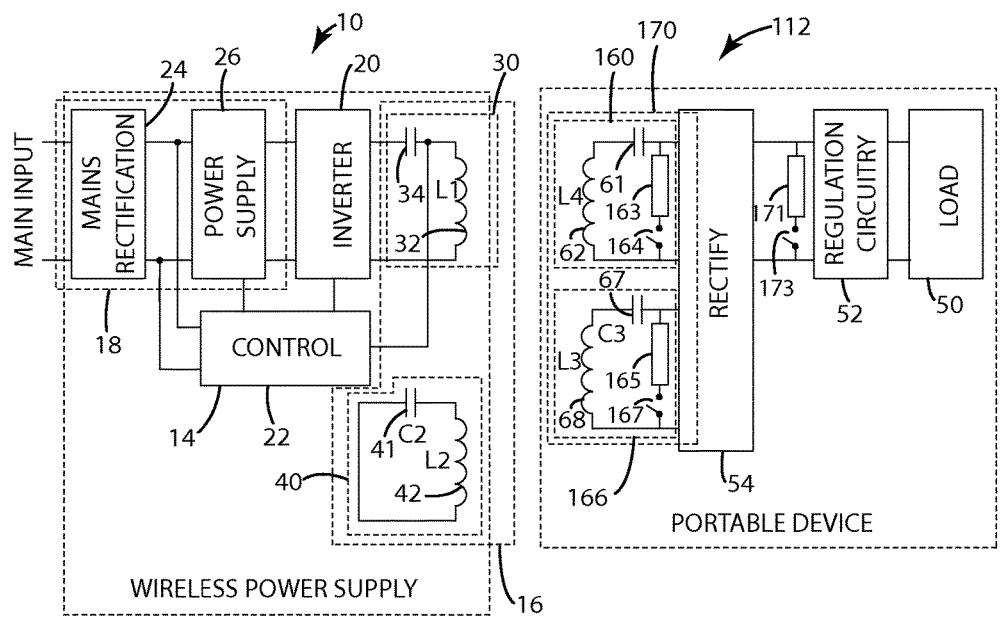
FIG. 9 is a schematic representation of the wireless power supply and remote device in accordance with an alternative embodiment of the present invention configured to use multiple modulation elements in different circumstances.

In the illustrated embodiment of FIG. 9, the remote device 112 is similar to the remote device 12 of the current embodiment, with several exceptions. The wireless power receiver 170 includes communication loads 163, 165 in the secondary tank circuit 160 and secondary re-resonator circuit 166 that may be selectively modulated to communicate information via the inductive power link. The remote device 112 may also include a communication load 170 capable of being selectively modulated to communicate information.

The communication loads 163, 165, 170 may be resistors or other circuit components capable of selectively varying the overall impedance of the remote device 12 via switches 164, 167, 171. For example, as an alternative to a resistor, the communication load 163, 165, 170 may be a capacitor or an inductor (not shown). Although the illustrated embodiments show three communication loads 163, 165, 170, a single communication load or more or fewer than three communication loads may be used. For example, the system may incorporate a dynamic-load communication system in accordance with an embodiment of U.S. application Ser. No. 12/652,061 entitled COMMUNICATION ACROSS AN INDUCTIVE LINK WITH A DYNAMIC LOAD, which was filed on Jan. 5, 2010, and which is incorporated herein by reference in its entirety. Although the communications load 163, 165, 170 may be a dedicated circuit component (e.g., a dedicated resistor, inductor or capacitor), the communication load 163, 165, 170 need not be a dedicated component. For example, in some applications, communications may be created by toggling the principle load 50 or some portion of the principle load 50. The communications load 163, 165, 170 may also be located in essentially any position in which it is capable of producing the desired variation in the impedance of the remote device 12.

As noted above, the wireless power supply 10 and remote device 12 of the illustrated embodiment are configured to communicate over the inductive power link. In this embodiment, the wireless power supply 10 and remote device 12 communicate by modulation to create digital communications on top of the power supply signal. In the illustrated embodiment, the remote device 12 varies its load by modulating a resistor into the circuit. Although the illustrated embodiment uses a communication resistor to create communications, the remote device 12 may alternatively create load in other ways, for example, by applying a communications capacitor or some other internal circuit component capable of varying the load with sufficient magnitude to create communication signals that will reflect back to the wireless power supply 10 through reflected impedance. The wireless power supply 10 and remote device 12 may be configured to communicate using essentially any data encoding scheme.

C. Methods of Operation

The methods of the present invention are described primarily in the context of embodiments in which the communication system 22 is communicating with one or more remote devices 12.

Generally speaking, the wireless power supply 10 uses a sync signal to provide timing information, including open communication time slots, closed time slots, and other application information. The remote devices 12 may use this information to determine when and how to communicate back to the wireless power supply 10. In this way, the remote devices 12 may avoid communicating at the same time, preventing potential data collisions and data loss. For example, once the sync signal is received, the remote devices 12 may randomly select which time slot to communicate in. If the remote device then determines that its time slot has been properly assigned, it may communicate during that time slot until power is removed or until the wireless power supply 10 reassigns time slots.

Figure 4:
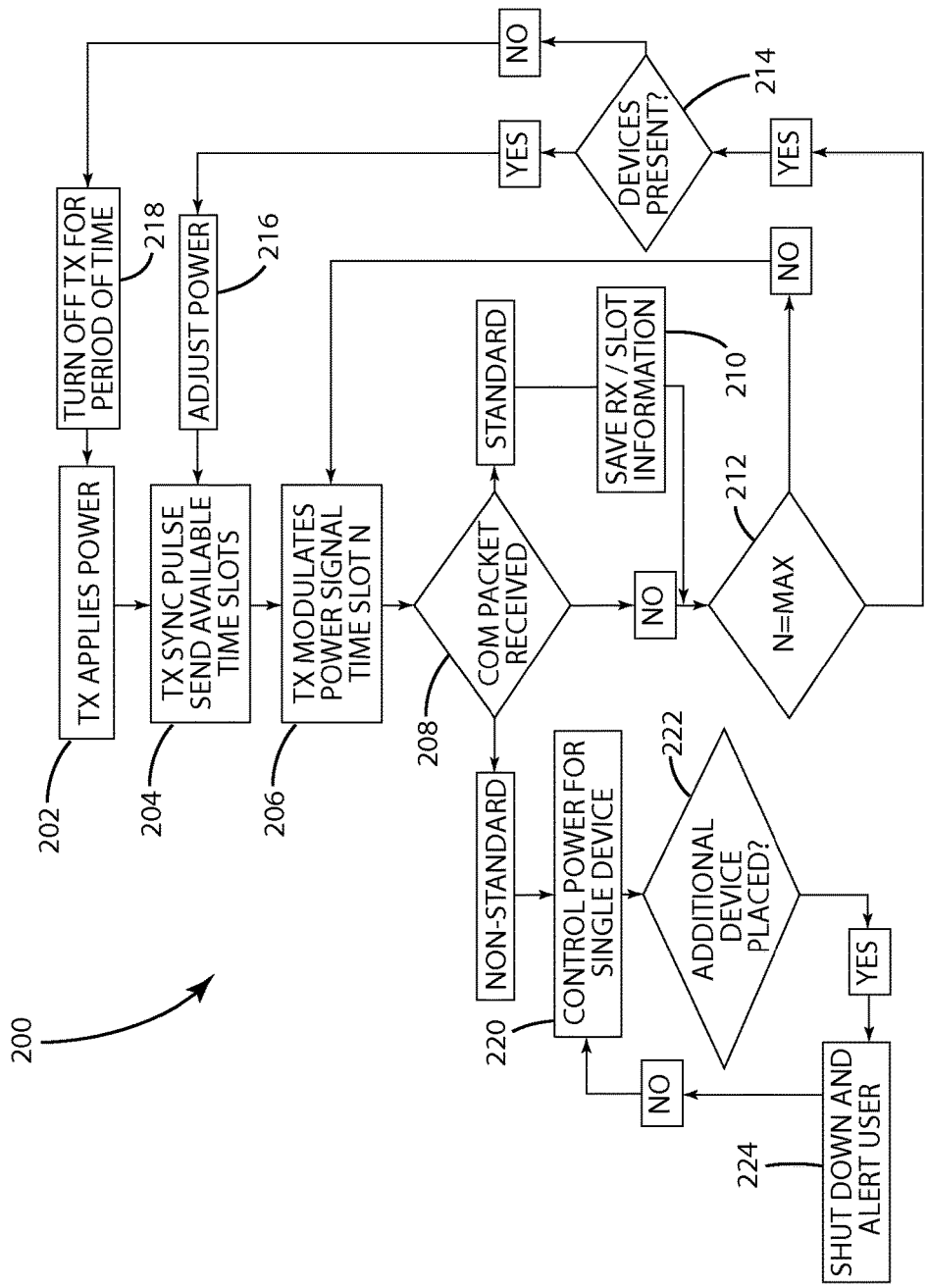
FIG. 4 is a flowchart showing the general steps of a method in accordance with an embodiment of the present invention.

An embodiment of a method for controlling communication and power transfer in a wireless power supply 10 will now be described with reference to the process 200 of FIG. 4 and the timing diagrams of FIGS. 7 and 8. The process primarily includes the steps of applying power, transmitting a sync packet, listening for devices, assigning slots, controlling wireless power, shutting off if no devices are present, and switching to a power control method for non-standard devices. The order and scope of these steps may be different depending on the application and configuration of the wireless power supply system, and some embodiments of the described method may have steps omitted, added, or a combination thereof.

To control communication and power transfer, the wireless power supply 10 may apply power to the wireless power transmitter 16 for a relatively short duration without communication, and then send a sync communication packet identifying characteristics about itself, as well as listing the number of open or assigned time packets. Steps 202 and 204. The sync communication packet in the current embodiment is a bi-phase encoded packet where edges, or presence or absence of transitions, indicate logical values in the packet. It should be understood that any encoding scheme may be used to communicate information over the inductive power link using modulation, and that the present invention is not limited to bi-phase encoding. Rather, a bi-phase encoded communication packet is described herein for purposes of disclosure.

The sync communication packet may include a sync pulse (a logical one in the current embodiment) that signals to any present remote devices 12 the start of communication, and that a listing of open and assigned time slots will follow. The sync pulse and timing of communication may be frequency dependent, lasting 512 cycles of the carrier in the current embodiment. As an example, if the carrier frequency is 100 kHz, the duration of the sync pulse is approximately 5 ms, and if the carrier frequency is 200 kHz, the duration of the sync pulse is approximately 2.5 ms. Alternatively, the sync pulse and timing of communication may be a predetermined time length that is not frequency dependent. Because communication is being modulated over the inductive power link in the current embodiment, the carrier frequency is the operating frequency of the wireless power supply 10. Timing for the listing of open and assigned time slots is similar to the sync pulse.

In the current embodiment, the wireless power supply 10 has four available slots for remote devices 12 to communicate in. There may be more or fewer slots in alternative embodiments, but for purposes of disclosure the method 200 is described in connection with four time slots. The time slots in the current embodiment are each 30 ms in duration to allow time for a remote device 12 to transmit a 3 byte packet at 2 kbps (a 22.5 ms communication string). This configuration may also allow time for the wireless power supply 10 to periodically adjust power levels (e.g., using a proportional-integral-derivative (PID) algorithm) to comply with wireless protocol standards, such as the Qi standard of the Wireless Power Consortium. The duration of the time slots and the power control algorithm may each change from application to application.

For each of the four time slots, a bit field in the sync communication packet transmitted from the wireless power supply 10 indicates whether a time slot is open or assigned. For example, if the bit field for a time slot is a zero, that time slot has been assigned, and if the bit field is a one, that time slot is available. With four time slots and a sync pulse, the sync communication packet in this embodiment is approximately 25.6 ms in duration using a 100 kHz carrier wave.

Once the wireless power supply 10 has completed transmitting the sync communication packet, including the sync pulse and the status of the time slots, it may modulate the power signal at a constant level to identify to the remote devices 12 when each time slot is occurring. Step 206. For example, as shown in the illustrated embodiment of FIGS. 7 and 8, modulation over the inductive power link may indicate a transition from high to low for the start of slot one, and then transition from low to high to indicate the end of slot one and the start of slot two. The modulation technique used to identify when each time slot is occurring may be the same as that used for the communication packet, or may be a different modulation technique. For example, the sync communication packet may be modulated over the inductive power link using frequency modulation, while identification of each time slot may be modulated using amplitude modulation, both of which the remote devices 12 may decode.

In this embodiment, the one or more remote devices 12 may communicate back to the transmitter during their selected time slots, and the wireless power supply 10 may listen for communication during each time slot.

If no valid communication is received during a time slot, the wireless power supply 10 may proceed to the next time slot. Steps 208, 212 and 206. If after each time slot has passed, and no communication is received during any of the time slots, the wireless power supply 10 may look for presence of remote devices 12 and turn off for a period of time before restarting the process. Steps 212, 214 and 218. In this way, when no devices are present, the wireless power supply 10 may turn off power to the wireless power transmitter 16 and apply small amounts of power at certain intervals in order to reduce power consumption.

Alternatively, the wireless power supply 10 may try several times to initiate power transfer in case, for example, remote devices 12 are present but data packet collisions are preventing them from communicating with the wireless power supply 10. The wireless power supply 10 may be configured to detect invalid data packets, and may retry to initiate power transfer for a predetermined number of cycles or may continue to try and initiate power transfer until no communication packets—valid or invalid—are detected.

If communication is received during a time slot, and that communication is a non-standard packet of information, the wireless power supply 10 may switch to a control power method for a single non-standard remote device 12. Steps 208 and 220. However, if the wireless power supply 10 detects that there are more remote devices 12, standard or non-standard, in addition to the non-standard remote device 12, the wireless power supply 10 may shut down and alert the user. Steps 222 and 224. Shutting down in the presence of more than one remote device, one of which is non-standard, may prevent data collisions and possible damage due to incorrect supply of wireless power.

If communication is received during a time slot, and that communication is a standard packet of information, the wireless power supply may use that information to assign that time slot to the remote device 12 from which the communication packet was sent. Steps 208, 210 and 212. The wireless power supply 10 may also store any valid communication and continue until all the time slots have been completed. Step 212.

Once the wireless power supply has completed assigning time slots, it may use the information gathered about the remote devices 12 to either adjust power, maintain the same power, or turn off power if there are no remote devices 12 present. Steps 214, 216 and 218. If a remote device 12 or a set of remote devices 12 have been identified, the wireless power supply 10 may determine how the power needs to be adjusted, or if the power needs to be maintained. In one embodiment, such a determination may be made based on the communication packet received from the one or more remote devices 12. For example, the communication packet from the one or more remote devices 12 may include a control error packet (CEP) that provides information relating to a request to maintain power or to adjust power. It should be understood that the communication packet from the one or more remote devices may not include a CEP.

If one remote device 12 has been identified, the wireless power supply may adjust power according to the needs of that device. Step 216. The wireless power supply 10 may adjust power by varying the operating frequency, resonant frequency, rail voltage, duty cycle, or switching phase (if it is using a full bridge drive topology), but may use a different methodology for adjusting power than the method for communicating in order to reduce data corruption or prevent confusion. After the power is adjusted, the wireless power supply 10 may communicate to the remote device 12 information about which time slot the remote device 12 communicated back in, as well as information about which time slots are still available. Step 204. More specifically, the wireless power supply 10 may indicate to the remote device 12 that the time slot in which the remote device 12 communicated has been assigned to the remote device 12. This indication may be accomplished by toggling the bit field associated with the assigned time slot in the next sync communication packet.

If more than one remote device 12 is present, the wireless power supply 10 may determine if the power should be adjusted to meet the needs of the remote devices 12. Step 216. For example, if two remote devices 12 are present, and both devices 12 require less power, then the wireless power supply 10 may reduce the power being applied. If both devices 12 are at the appropriate level of power, the wireless power supply 12 may maintain the power level being provided. And, if either remote device 12 requests more power, the wireless power supply 10 may increase the applied power to ensure that both devices have enough power. In a manner similar to the remote device 12 example described above, after the power has been adjusted, if appropriate, the wireless power supply 10 may communicate to the remote devices 12 information about which time slot the remote device 12 communicated back in, as well as, information about which time slots are still available.

The remote devices 12 in the current embodiment may communicate their power needs to the wireless power supply 10, and may be configured to accept more power than required in the event that the wireless power supply 10 is providing additional power for another remote device 12. The remote device 12 may make adjustments to regulate power if it is receiving more than required, including using the regulation circuitry 52 to reduce the voltage being received, reconfiguring the impedance of the wireless power receiver 70, reconfiguring the rectifier 54, or varying the Q in order to reach the desired voltage without requiring the wireless power supply 10 to reduce power.

Figure 5:
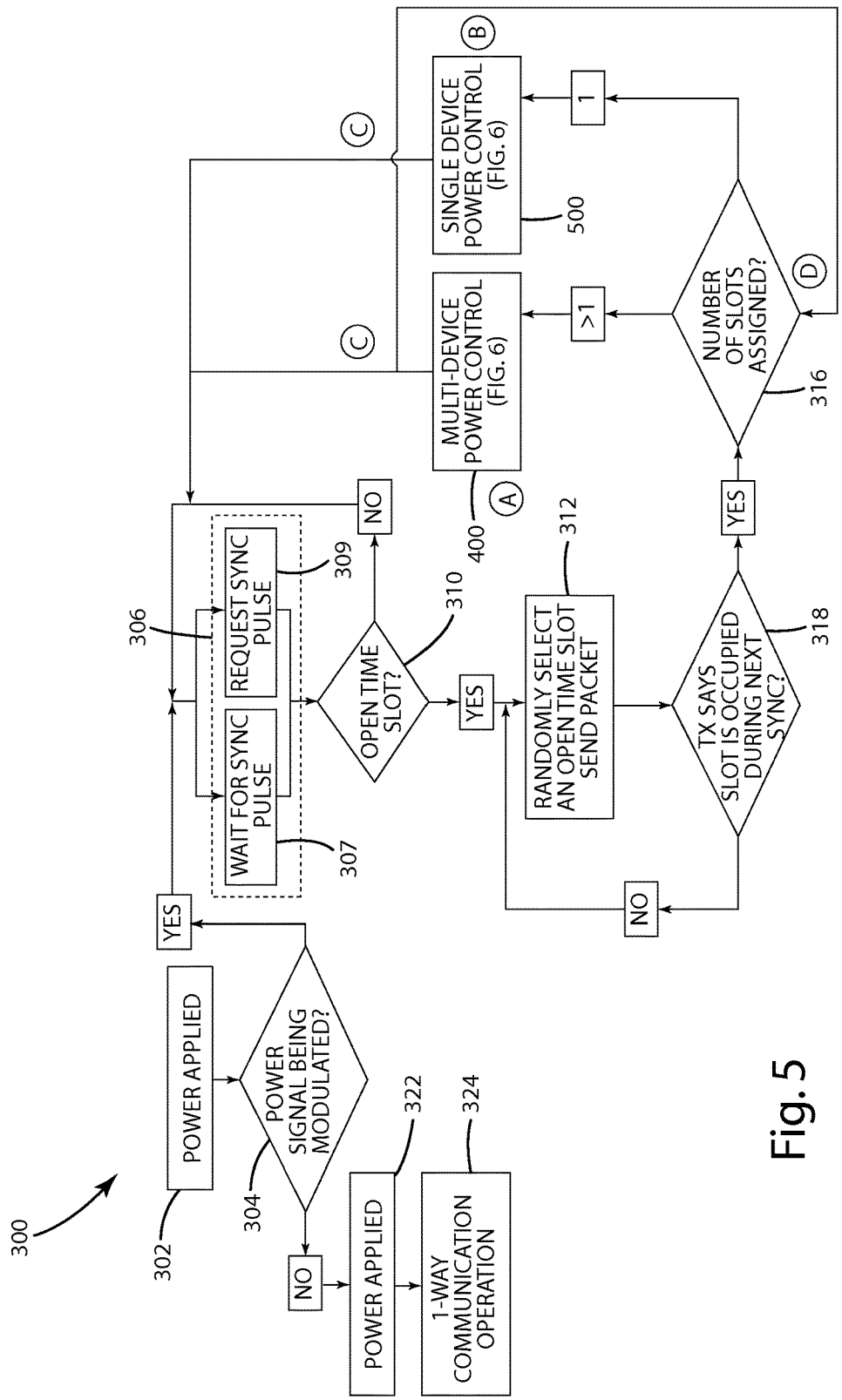
FIG. 5 is a flowchart showing the general steps of a method in accordance with an embodiment of the present invention.

Turning to a method for communicating from a remote device 12 to a wireless power supply 10, the process 300, 400 and 500 will now be described with reference to FIGS. 5 and 6. The process primarily includes the steps of determining the type of wireless power supply 10, looking for an open slot to communicate in, checking for an acknowledgement from the wireless power supply 10, determining if there are other remote devices 12 present, determining if the wireless power supply 10 is responding appropriately, and checking to ensure the wireless power supply 10 is still acknowledging presence. The order and scope of these steps may be different depending on the application and configuration of the wireless power supply system, and some embodiments of the described method may have steps omitted, added, or a combination thereof.

To communicate with the wireless power supply 10, the remote device 12 first waits to receive power via the wireless power receiver 70. Step 302. If the remote device 12 fails to detect modulated information or a sync communication packet over the wireless power link and wireless power is still being supplied, the remote device 12 may operate as if the wireless power supply 10 receives one-way communication. Steps 304, 322 and 324. In this configuration, for example, the remote device 12 may communicate information such as a request for more or less power without consideration for data collisions.

If the remote device 12 detects modulated information over the wireless power link, it may wait for a sync communication packet or request a sync communication packet. Steps 306, 307 and 309. The remote device 12 may be configured to wait for (step 307) rather than request (step 309) a sync communication packet in some embodiments. In embodiments where the remote device 12 is configured to request a sync communication packet, the remote device 12 may communicate such a request if it detects a wireless power supply 10 capable of communicating using the methods described herein. Step 309. Once the sync communication packet has been detected, the remote device 12 may look for available time slots in which it can communicate. Step 310. If a slot is not available, the remote device 12 may continue to monitor the communication channel until a slot becomes available. Steps 310, 306. However, if one or more slots are available, the remote device 12 may randomly select one to communicate in. Step 312. Random selection may be performed to prevent multiple remote devices 12, each similarly configured, from consistently selecting the same slot at the same time.

Figure 7:
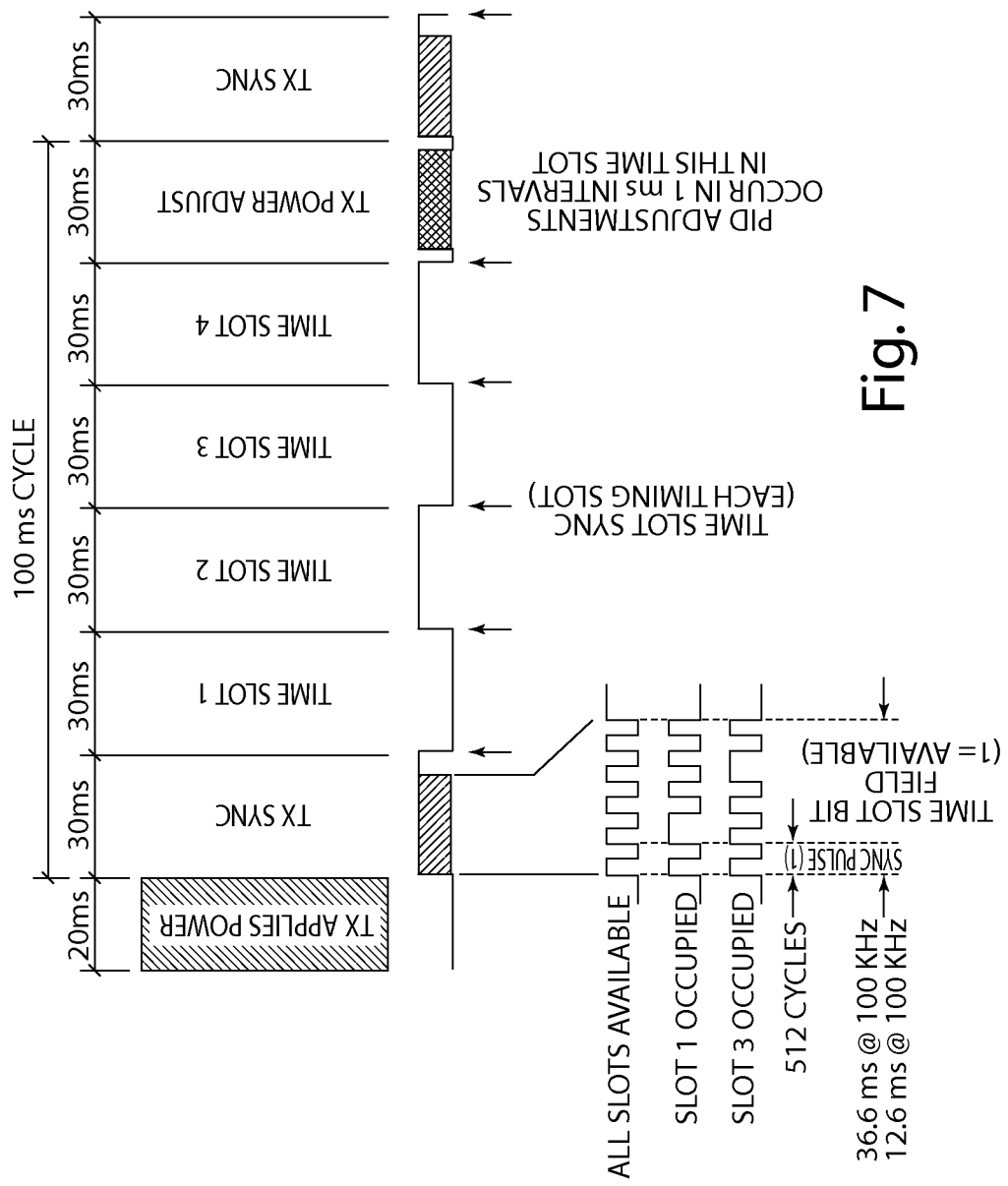
FIG. 7 is a timing diagram showing the general sequence of a method in accordance with an embodiment of the present invention.
Figure 8:
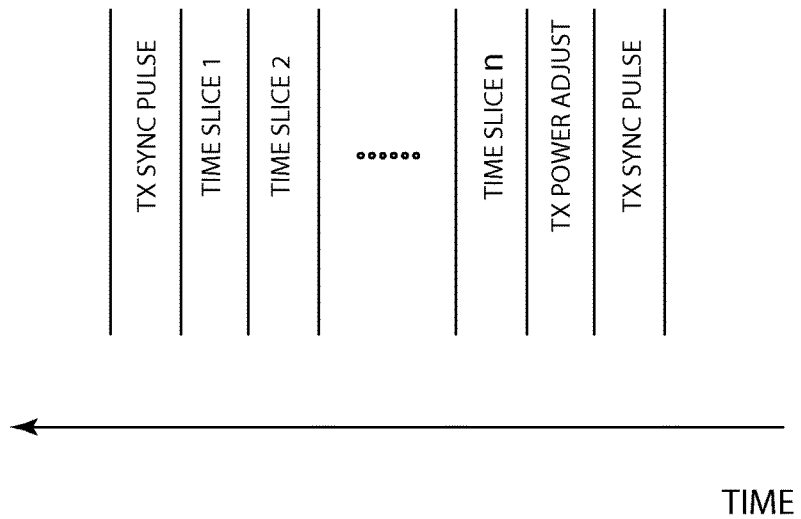
FIG. 8 is a timing diagram showing the general sequence of a method in accordance with an embodiment of the present invention.

Based on the modulations from the wireless power supply 10 and shown in FIG. 7, the remote device waits for an indication that its chosen slot has started in the sequence of communication, and then transmits communication to the wireless power supply 10 using modulation over the wireless power link during that slot. On the one hand, if the next sync communication packet received from the wireless power supply 10 indicates that the chosen slot is not occupied, the remote device 12 may select another slot to communicate in and again look for a change in the state of the chosen slot in the following sync communication packet. Steps 312 and 314. These steps may be repeated indefinitely until an acknowledgment is received from the remote device, or may be repeated a finite number of times before the remote device 12 stops trying, and possibly provides an error indication the user. On the other hand, if the next sync communication packet received from the wireless power supply 10 indicates that the chosen slot is now occupied, the remote device 12 may understand the change in status of the chosen slot as an acknowledgement from the wireless power supply 10 that the wireless power supply 10 has associated the chosen slot with the remote device 12. Steps 312 and 314.

Next, the remote device 12 may review the sync communication packet to determine if it is the only device being supplied power wirelessly or if there are more remote devices 12 in the system in addition to itself. If the remote device 12 is the only device, it may begin receiving power according to the single device power control step 500. However, if the remote device 12 is one of many remote devices 12 receiving power, the remote device 12 may begin receiving power according to the multi-device power control step 400 (described in further detail below). Step 316.

Figure 6:
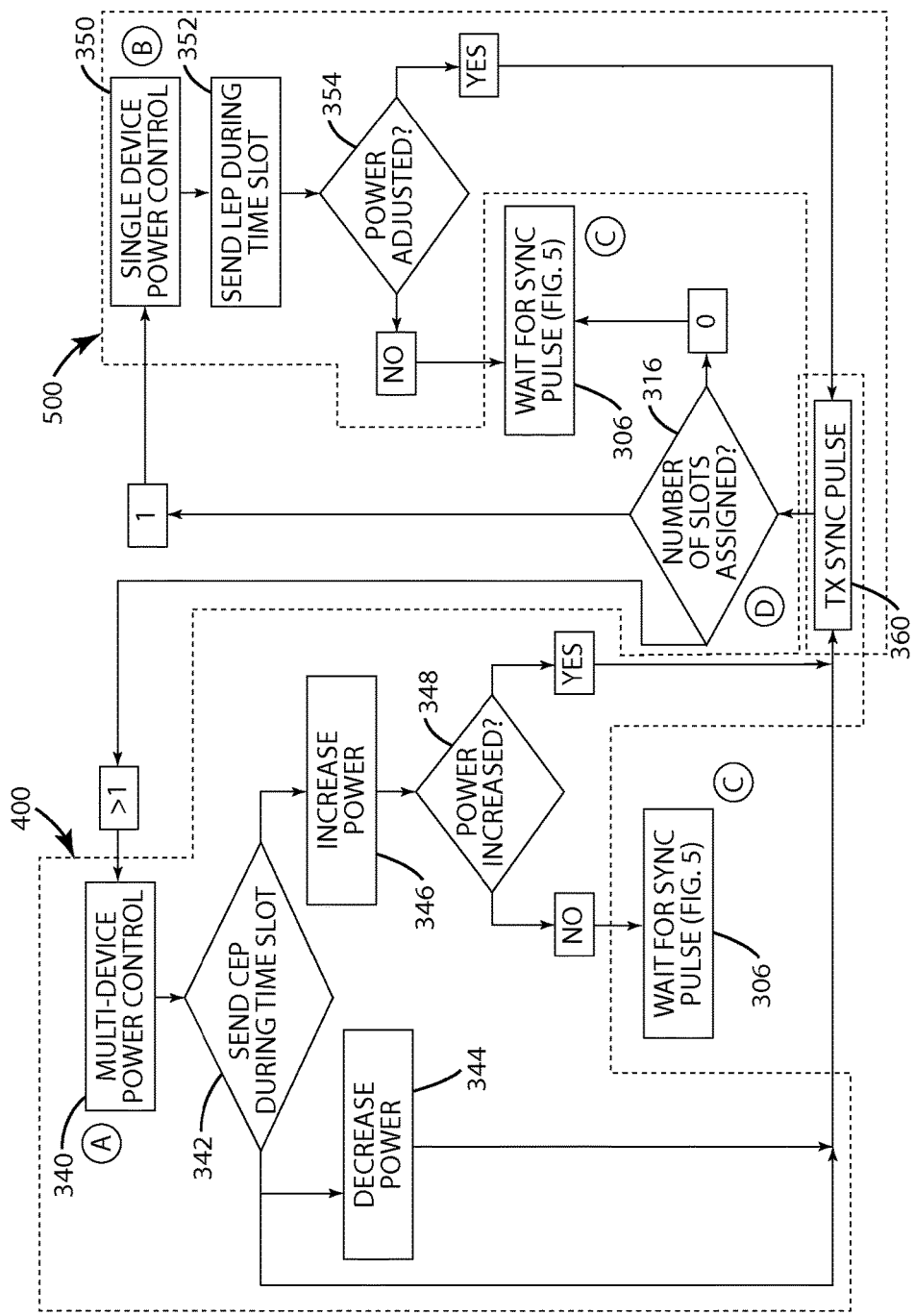
FIG. 6 is a flowchart showing the general steps of a method in accordance with an embodiment of the present invention.

Step 500 for receiving power in remote device 12, where no other remote devices are identified as receiving power, is shown in further detail in the illustrated embodiment of FIG. 6. The remote device 12 may communicate a control error packet (CEP) to the wireless power supply 12 during its assigned time slot. Steps 350 and 352. The CEP may include information relating to how much power the remote device 12 desires. It should be understood that information in addition to the CEP may also be transmitted, or that information without the CEP may be transmitted. If the remote device 12 detects a power adjustment in response to its request for a change in power, the remote device 12 may wait for the next sync communication packet, assuming that the wireless power supply 10 is receiving its requests and that communication remains established. Steps 354 and 360. Once the next sync communication packet has been received, the remote device 12 may make a determination, based on the number of slots assigned, whether to repeat the steps of receiving power according to single device power control (step 350) or switch to the multi-device power control steps 400. If the next sync communication packet indicates that the time slot the remote device 12 believes to be assigned to itself is, in fact, not assigned, then the remote device 12 may initiate assignment of a time slot to communicate in, starting with step 306 described above. Steps 316 and 306.

At step 354, if the remote device 12 detects that power has not been adjusted despite a request to the contrary, the remote device 12 may determine that communicated information is not being received by the wireless power supply 10 in the assigned time slot. Based on this determination, the remote device 12 may initiate assignment of a time slot to communicate in, starting with step 306 described above. Steps 354 and 306.

Step 400 for receiving power in the remote device 12 along with additional remote devices 12 is shown in further detail in the illustrated embodiment of FIG. 6. The remote device 12 may communicate a CEP to the wireless power supply 12 during its assigned time slot. Steps 340 and 342. As described above, the communication packet may also include additional information other than the CEP, or may include information without the CEP. In the illustrated embodiment, if the remote device 12 communicates a request to decrease power, the remote device 12 may wait for the next sync communication packet similar to the method of step 500 described herein. Steps 344 and 360. Because the remote device 12 in this embodiment may be configured to accept more power than needed, the remote device 12 may not take additional steps if power is not decreased in response to a request to decrease power. In alternative embodiments, the remote device 12 may determine whether to initiate assignment of a time slot to communicate in if power does not decrease in response to such a request. If the remote device 12 has not requested a change in power, or if the communication packet sent to the wireless power supply 10 does not include a CEP, the remote device may wait for the next sync communication packet. Step 360.

In the current embodiment, if the remote device 12 communicates a request to increase power, but determines that power has not increased as requested, then the remote device 12 may determine that communicated information is not being received by the wireless power supply in the assigned time slot. Steps 346 and 348. Based on this determination, the remote device 12 may initiate assignment of a time slot to communicate in, starting with step 306 described above. Steps 348 and 306. If, however, the remote device 12 detects an increase in power in response to its request for such an increase, the remote device 12 may wait for the next sync communication packet, assuming that the wireless power supply 10 is receiving its requests and that communication remains established. Steps 348 and 360. Once the next sync communication packet has been received, the remote device 12 may make a determination, based on the status of the time slots, whether to repeat the steps of receiving power according to multi-device power control (step 340) or to switch to the single device power control steps 500. If the next sync communication packet indicates that the time slot the remote device 12 believes to be assigned to itself is, in fact, not assigned, then the remote device 12 may initiate assignment of a time slot to communicate in, starting with step 306 described above. Steps 316 and 306.

D. Second Embodiment

In a second embodiment of the present invention, the system and method of a wireless power supply and a remote device are similar to those described herein with respect to the wireless power supply 10 and remote device 12, with several exceptions. The second embodiment may use a system and method similar to those of the current embodiment, and may further include a remote device 12 configured to detect how many remote devices are placed on the same wireless power supply 10 and to vary their power control methods based on the number of devices detected.

In this embodiment, when a remote device 12 chooses a time slot, it checks the following sync communication packer from the wireless power supply 10 to determine if the time slot chosen is now acknowledged by the wireless power supply 10 as being occupied. However, if two remote devices 12 have chosen the same time slot, and the wireless power supply 10 is able to receive a full communication packet from one remote device 12 but not the other, the remote device 12 that is unable to communicate a full packet may assume that the wireless power supply 10 was able to receive its information. This may occur when two remote devices 12 are placed on the wireless power supply 10 at one time, but one remote device 12 may be closer, or may have a modulator that modulates its load at a much higher level so that the modulator on the second remote device 12 does not affect the power signal enough to cause data corruption.

If a wireless power supply 10 has missed a communication packet that the remote device 12 assumes to have been received, the remote device 12 may be able to operate while the power being supplied is sufficient; however, the remote device 12 may not be able to communicate to the primary a request for increased power. If a remote device 12 is able to determine that the wireless power supply 10 has not been able to receive communication packets, the remote device 12 may check to see how many available time slots are left, and choose one of the remaining time slots, if available, to communicate in.

In response to the wireless power supply 10 sending a sync communication packet acknowledging only one assigned time slot, the remote device 12 may expect the wireless power supply 10 to adjust power if the remote device 12 requests more power or less power. In this second embodiment, if the wireless power supply 10 does not adjust the power when requested, the remote device 12 may change time slots on the chance that there may be another remote device 12 communicating with the wireless power supply 10 using the same time slot. If the wireless power supply 10 (a) acknowledges the new time slot, (b) indicates that there is still only one remote device 12, and (c) still does not adjust power, the remote device 12 may decide to turn off, send an error message, warn the user, or any combination thereof.

In response to the wireless power supply 10 acknowledging multiple assigned time slots, a remote device 12 may maintain its time slot when the wireless power supply 10 does not reduce the power based on a request from the remote device 12. However, the remote device 12 may then search for a new time slot if the wireless power supply 10 does not increase the power based on a request from the remote device. If a wireless power supply does not respond after a new time slot is found and acknowledged, the remote device 12 may turn off, continue requesting less power, send an error message, warn the user, reduce the maximum power it is configured to supply to the load, or any combination thereof.

In an alternative embodiment, a remote device 12 may decide not to request less power in response to determining that multiple devices are being powered by the wireless power supply 10. In this case, the remote device 12 may still communicate its presence to the transmitter, but may not request any change in power until the remote device 12 requires more power.

E. Third Embodiment

In a third embodiment of the present invention, the system and method of a wireless power supply and a remote device are similar to those described herein with respect to the wireless power supply 10 and remote device 12, with several exceptions. The third embodiment may use a system and method similar to those of the current embodiment, and may further include a wireless power supply 10 configured to request that a remote device 12 reduce its power consumption. The wireless power supply 10 may request that a remote device 12 reduce its consumption if certain criteria are met: (a) if the maximum power available to the wireless power supply 10 is reached, (b) if the wireless power supply 10 determines there are foreign objects within the active magnetic field, (c) if another remote device 12 requests an urgent desire to reduce power in the field, or (d) if the wireless power supply 10 detects an over temperature situation within itself.

F. Fourth Embodiment

In a fourth embodiment of the present invention, the system and method of a wireless power supply and a remote device are similar to those described herein with respect to the wireless power supply 10 and remote device 12, with several exceptions. The fourth embodiment may use a system and method similar to those of the current embodiment, and may further include a remote device 12 that may vary the impedance of its modulation element(s) depending on the configuration.

In this embodiment, for example, if the remote device 12 desires to send a high priority message, it may use a separate or additional modulator that causes a modulation large enough to overpower the modulators of other remote devices 12, and may decide to send the information at any point in time, rather than waiting for its assigned time slot. The remote device 12 may also request that the wireless power supply 10 resend a sync communication packet if the remote device 12 has determined there may be multiple remote devices 12 being powered and the wireless power supply 10 has not been able to receive the communication packets being sent by the remote device 12. In an alternative embodiment, the remote device 12 may request a new sync communication packet if it has just been placed on the wireless power supply 10, or if it has determined that the system timing is incorrect.

G. Fifth Embodiment

In a fifth embodiment of the present invention, the system and method of a wireless power supply and a remote device are similar to those described herein with respect to the wireless power supply 10 and remote device 12, with several exceptions. In this embodiment, a non-standard device (e.g., a remote device 12 capable of receiving and controlling power but not utilizing the current communication embodiment) is detected and powered utilizing a communication protocol supported by the non-standard device.

The wireless power supply 10 may be configured to detect remote devices 12 that may be able to receive wireless power and communicate, but that may not be able to receive communication from the wireless power supply 10. The wireless power supply 10 may detect these remote devices 12 using their identification information sent during communication, or because communication packets are not being received by the wireless power supply 10 during the assigned time slot. In this situation, the wireless power supply 10 may stop sending its sync communication packets and slot timing information, and simply adjust power for the remote device 12 that is present.

Remote devices 12 that may be considered "non-standard" devices may be a different version or a previous version of the remote devices 12 described herein that are configured to communicate with the wireless power supply using one or more methods of the present invention. For example, non-standard devices may be configured only for close coupled situations, while the wireless power supply 10 may be configured with a re-resonator 40 to supply power at an extended range to one or more remote devices 12.

In one embodiment, an adaptor including a resonating coil may be added to the non-standard remote device 12, enabling it to receive power at an extended range while providing communication back to the wireless power supply 10. However, this remote device 12 may not be able to receive bi-directional communication and may not be able to send its communication packets at the appropriate time, potentially causing data corruption when multiple remote devices 12 are trying to communicate.

In this configuration, the wireless power supply 10 may only support one non-standard remote device 12, and if a second remote device 12 is placed, it sends an error message, alerts the user, removes power, or any combination thereof. In an alternative embodiment, if the wireless power supply 10 is supplying power to one or more standard remote devices 12 and a non-standard device 12 is placed near the wireless power transmitter 16, the wireless power supply 10 may again send an error message, alert the user, remove power, or any combination thereof.

H. Sixth Embodiment

In a six embodiment of the present invention, the system and method of a wireless power supply and a remote device are similar to those described herein with respect to the wireless power supply 10 and remote device 12, with several exceptions. The sixth embodiment may use a system and method similar to those of the second embodiment, and may further include remote devices 12 configured to detect how many remote devices 12 are being placed in proximity to the same wireless power supply 10 and to vary their power control methods based on the number of devices detected.

In this embodiment, the method of communication may allow for messages of varying importance from the remote device. This may, notably, help mitigate circumstances where the remote device 12 is experiencing field strength in excess of what it is capable of dissipating or otherwise regulating to acceptable levels. The remote device 12 may then send a message of higher priority indicating that it is unable to tolerate more power. The wireless power supply 10 may then cease increasing power even if other remote devices 12 are asking for more.

There may be several tiers of priority for control error messages. Highest priority may be associated with an "over-voltage danger" or another message indicating a condition that would be potentially unrecoverable, causing damage to the device. Second priority may be associated with "under-voltage danger" or other messages indicating a recoverable condition. This second priority condition may include any time a remote device sees operation below its normal ability, whether that is communication or power. Third priority may be associated with a power control message, indicating the remote device 12 desires more power. For example, the remote device 12 may place a higher priority on power needs if its battery is nearly discharged and power is needed quickly. Normal messages sent when the remote device 12 is within its acceptable operating range may be standard priority. These messages, regardless of priority, may be sent in the same time slot and with the same modulator. The priority of the messages may be indicated at the beginning of the data packet.

I. Seventh Embodiment

In a seventh embodiment of the present invention, the system and method of a wireless power supply and a remote device are similar to those described herein with respect to the wireless power supply 10 and remote device 12, with several exceptions. Referring to the sync communication packet, as illustrated in FIG. 7, this seventh embodiment may include a wireless power supply 10 configured to request additional information from a remote device 12 using the sync communication packet. For example, instead of indicating the available time slots to a remote device 12, the sync communication packet may also be formatted to contain unique identifiers that remote devices 12 could recognize. These identifiers may contain a request for information about how much power each remote device 12 is currently receiving instead of a control packet. Such a feature may allow a wireless power supply 10 to reconcile power and determine if excess power is being lost into nearby metallic objects. The unique identifiers may also include a request for other information from the remote devices 12 for things such as maximum power required, minimum power required, remote device identifier or a combination thereof.

Referring again to FIG. 7, the main transmitter sync packet (TX Sync) can utilize digital bi-phase data encoding where "edges" are indicated by toggling of an LSB on the transmitter period control register. For example, the bit time can be equivalent to 512 cycles of a carrier (where timing is frequency dependent), the first sync bit is always '1', and the last four sync bits represent a bit field of available time slots. The time slot sync (Time Slot 1) utilizes a single frequency change, indicated by toggling of an LCB of the transmitter period control register. Also shown in FIG. 7, the time slots can be about 30 ms in the present embodiment, based on a) RX transmission time of 22.5 ms for a 3-byte packet at 2 Kbps, b) a TX PID window of approximately 30 ms, and c) a 5-bit TX Synx at 100 kHz transmitting in 25.6 ms. The time slot can be above or below 30 ms in other embodiments as desired.

J. Eighth Embodiment

In an eighth embodiment of the present invention, the system and method of a wireless power supply and a remote device are similar to those described herein with respect to the wireless power supply 10 and remote device 12, with several exceptions. The eighth embodiment may use a system and method similar to those of the current embodiment, and may further include remote devices 12 that may have a range of operation, or range status information, communicated to the transmitter. In one embodiment, this range may be received voltage, but in alternative embodiments, the range may also be power, current, or magnetic field strength, or a combination thereof, including combinations with voltage. Regarding control of the wireless power supply 10, understanding the limits of each remote device 12 within the control region may help the wireless power supply 10 control delivery of wireless power. For example, if each remote device 12 sends its limits to the wireless power supply 10, the wireless power supply 10 may make informed decisions about how much power to supply.

Another example of the wireless power supply 10 making informed decisions includes circumstances in which the remote device is limiting its Q. Although limiting the Q may be managed in the remote device 12 independently of the wireless power supply 10, a remote device 12 in which the Q is limited may have a voltage range of operation that may be communicated to the wireless power supply 12. The communication about the range of operation may include limit information as well as information relating to the current operating parameters of the remote device 12. For example, the communication may include information such as x % of limit, high limit=y, low limit=z, which may be transmitted in a control message from each remote device 12. This information may allow for one to many power control of the wireless power supply 12 to function for the remote devices 12 within the control region of the wireless power supply 10.

For purposes of disclosure, the parameters being communicated from the remote devices 12 include range information, but the present invention is not limited to this information. Communicated parameters may include information on foreign object detection thresholds, variables and constants, voltage limits, parasitic properties over a range, best mode for efficiency, power requirements based on usage or time (priority power), best mode for standby power, and negotiated power (allowable level and limits), and combinations thereof.

When multiple remote devices 12 are being powered by wireless power supply 10, the ranges communicated to the wireless power supply 10 may determine how the wireless power supply 10 adjusts for given requests for more or less power. For example, if one remote device 12 requests additional power and the wireless power supply 12 is able to determine that the resulting adjustment would allow both remote devices 12 to operate within their communicated range, the wireless power supply 10 may be able to adjust the power to meet the power needs of both remote devices 12. However, if one remote device 12 is using less power and is already operating at the top of its range, the wireless power supply 10 may ignore a request from a different remote device 12 asking for more power, assuming the different remote device 12 is operating within its acceptable range.

As an example, in order to approximate the acceptable range of a remote device 12, the wireless power supply 10 may take into account the communicated range, the power being received by remote device 12, the size of the coils of the remote devices 12, the distance each remote device 12 is from the wireless power supply 10, and the type of each remote device 12 in order to approximate the resulting range. This approximation may be useful because the range communicated by a remote device 12 may be the range of acceptable voltages it receives. Calculating the acceptable range and taking into account the acceptable range of the wireless power transmitter 16 of the wireless power supply 10 may aid accurate control of the system.

The above description is that of current embodiments of the invention. Various alterations and changes can be made without departing from the spirit and broader aspects of the invention. This disclosure is presented for illustrative purposes and should not be interpreted as an exhaustive description of all embodiments of the invention or to limit the scope of any claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims.

The invention claimed is:

1. A wireless power supply for transferring power to at least one remote device, said wireless power supply comprising:
   a wireless power transmitter for transferring power to the at least one remote device, said wireless power transmitter configured to form an inductive power link between said wireless power supply and the at least one remote device;

a communication circuit coupled to said wireless power transmitter, said communication circuit configured to transmit and receive information from the at least one remote device via said inductive power link, wherein said information transmitted to the at least one remote device provides first timing information to the at least one remote device indicative of one or more time slots available to the at least one remote device for communication with said communication circuit;

wherein in response to receiving communication, via said inductive power link, from the at least one remote device in at least one of said one or more time slots, said communication circuit is configured to assign the at least one time slot as occupied by the at least one remote device; and wherein said information transmitted to the at least one remote device subsequent to said assignment includes second timing information indicative of the at least one time slot being occupied and indicative of one or more time slots as available for communication with said communication circuit;

wherein based on assignment of the at least one time slot as occupied by the at least one remote device, the communication circuit is configured to identify further communications received via said inductive power link in said at least one time slot as being transmitted from the at least one remote device.

2. The wireless power supply of claim 1 wherein said wireless power supply is configured to transfer power to a plurality of remote devices, and wherein said communication circuit is configured to assign each of the remote devices to one of said time slots.

3. The wireless power supply of claim 1 wherein said information includes a plurality of bit fields each indicating a state of one of said time slots, and wherein said state identifies whether each of said time slots is assigned or open.

4. The wireless power supply of claim 3 wherein said communication circuit is configured to change a state of one of said time slots in response to receiving communication from the at least one remote device in said one of said time slots.

5. The wireless power supply of claim 3 wherein said information includes a sync pulse that alerts the at least one remote device to expect said plurality of bit fields.

6. The wireless power supply of claim 1 wherein said communication circuit is configured to adjust a first characteristic of power in response to messages received in time slots assigned to the at least one remote device.

7. The wireless power supply of claim 6 wherein said communication circuit is configured to modulate information over said inductive power link by varying a second characteristic of power.

8. The wireless power supply of claim 7 wherein said first and second characteristic of power include at least one of operating frequency, resonant frequency, rail voltage, duty cycle, and phase, and wherein said second characteristic of power is different from said first characteristic of power.

9. A method of operating a wireless power supply to transfer power to at least one remote device, said method comprising:
placing the remote device in sufficient proximity to a wireless power supply to form an inductive power link between the wireless power supply and the remote device;
operating the wireless power supply to transfer power to the remote device via the inductive power link;
transmitting, from the wireless power supply, a first communication packet to the remote device via the inductive power link, the communication packet having timing information indicative of one or more time slots available to the remote device for communication with the wireless power supply;
receiving, in the wireless power supply, a message from the remote device in at least one time slot of the one or more time slots;
assigning, at least one time slot as occupied by the remote device based on receipt of the message from the remote device via the inductive power link;
transmitting, from the wireless power supply, via the inductive power link a second communication packet subsequent to the assignment, the second communication packet having timing information indicative of the at least one time slot being occupied and indicative of one or more time slots as available for communication with said communication circuit; and
identifying further messages received via the inductive power link in the at least one time slot assigned as occupied by the remote device as being transmitted from the remote device.

10. The method of claim 9 wherein said receiving includes receiving the message from the remote device in one of the time slots, and further comprising associating the remote device with the one of the time slots.

11. The method of claim 10 further comprising:
associating a state with each of the time slots, the state indicating whether each of the time slots is assigned or open;
in response to associating the remote device with one of the time slots, changing the state of one of the time slots from open to assigned; and
re-transmitting the communication packet, the communication packet including information about the state of each of the time slots.

12. The method of claim 10 further comprising receiving, in the wireless power supply, a second message from another remote device in another of the time slots; and associating the another remote device with the another of the time slots.

13. The method of claim 9 further comprising adjusting a characteristic of power transferred to the remote device based on the message received from the remote device.

14. The method of claim 13 wherein the characteristic of power includes at least one of operating frequency, resonant frequency, rail voltage, duty cycle, and phase.

15. The method of claim 9 further comprising configuring for single power control mode in response to the message from the remote device being a non-standard packet of information.

16. The method of claim 9 further comprising periodically supplying power and shutting off in response to determining the at least one remote device is absent from a coupling region of the wireless power supply.

17. A remote device for receiving power from a wireless power supply, said remote device being separable from the wireless power supply, said remote device comprising:
a wireless power receiver for generating electrical power in response to a field generated by the wireless power supply;
communication circuitry for communicating with the wireless power supply;
a load coupled to said wireless power receiver, said load for receiving electrical power generated in said wireless power receiver in response to said field; and wherein said communication circuitry is configured to receive information indicative of one or more time slots in which the wireless power supply is configured to receive communication from said remote device, wherein said communication circuitry is configured to select one of said one or more time slots for communication in via the field generated by the wireless power supply, and wherein said communication circuitry is configured to transmit a message in said selected time slot via the field, wherein said communication circuitry is configured to receive information subsequent to said selection relating to said selected time slot being occupied and one or more time slots in which the wireless power supply is configured to receive communication, wherein in response to said information relating to said selected time slot being occupied, said communication circuitry is configured to transmit further messages in said selected time slot via the field, and wherein the wireless power supply associates said further messages received in said selected time slot via the field as being transmitted from said remote device.

18. The remote device of claim 17 wherein said communication circuitry is configured to select said selected time slot based on an indication in said received information that said selected time slot is available for communication.

19. The remote device of claim 18 wherein said communication circuitry is configured to wait for the wireless power supply to indicate a start of said selected time slot before transmitting said message.

20. The remote device of claim 17 wherein said message includes information relating to a request to adjust an amount of power being transmitted by the wireless power supply via the field.

21. The remote device of claim 17 wherein said communication circuitry is configured to select a different time slot in response to information received from the wireless power supply indicating that a state of said selected time slot remains unchanged from an open state.

22. The remote device of claim 21 further comprising regulation circuitry configured to regulate power being received by at least one of reducing power being received, reconfiguring an impedance of said wireless power receiver, reconfiguring rectification circuitry, and varying a Q of said remote device.

23. The remote device of claim 17 wherein said communication circuitry is configured to control whether said remote device is in a multi-device power control mode or a single-device power control mode.

24. The wireless power supply of claim 1 said communication circuit is configured to ignore partial communication in the time slots, wherein in response to receiving communication, via said inductive power link, from a different remote device in an unoccupied time slot, said communication circuit is configured to assign the unoccupied time slot as occupied by the different remote device.

25. The remote device of claim 17 wherein said further messages transmitted in said occupied time slot via the field include a request for the wireless power supply to adjust power transmission to the remote device, and wherein in response to a lack of power adjustment in the remote device, the communication circuitry is configured to transmit a message in an unoccupied time slot.

* * * * *